(12) United States Patent
Chen et al.

(10) Patent No.: US 11,498,713 B2
(45) Date of Patent: Nov. 15, 2022

(54) INTEGRATED DEVICE FOR DETECTING AND PACKAGING 3D PRINTED PHONE CASE

(71) Applicant: Dongguan University of Technology, Guangdong (CN)

(72) Inventors: Shenggui Chen, Dongguan (CN); Yongbo Huang, Dongguan (CN); Wentao Zhang, Dongguan (CN); Zhaoyang Lin, Dongguan (CN); Zhenzhong Sun, Dongguan (CN); Bingheng Lu, Dongguan (CN)

(73) Assignee: Dongguan University of Technology, Dongguan (CN)

( * ) Notice: Subject to any disclaimer, the term of this patent is extended or adjusted under 35 U.S.C. 154(b) by 250 days.

(21) Appl. No.: 16/912,698

(22) Filed: Jun. 25, 2020

(65) Prior Publication Data
US 2020/0407095 A1 Dec. 31, 2020

(30) Foreign Application Priority Data
Jun. 26, 2019 (CN) .......................... 201910559390.9

(51) Int. Cl.
| | |
|---|---|
| *B65B 57/14* | (2006.01) |
| *G01N 21/90* | (2006.01) |
| *B65B 61/28* | (2006.01) |
| *B65B 35/20* | (2006.01) |
| *B65B 5/10* | (2006.01) |

(Continued)

(52) U.S. Cl.
CPC .............. *B65B 57/14* (2013.01); *B65B 5/101* (2013.01); *B65B 35/12* (2013.01); *B65B 35/20* (2013.01); *B65B 61/28* (2013.01); *G01N 21/8851* (2013.01); *G01N 21/90* (2013.01)

(58) Field of Classification Search
CPC ........... B65B 5/04; B65B 5/101; B65B 61/28; B65B 35/12; B65B 35/20; B65B 57/14; B65B 25/00; G01N 21/8851; G01N 21/90
See application file for complete search history.

(56) References Cited

U.S. PATENT DOCUMENTS

| | | | | |
|---|---|---|---|---|
| 2003/0205033 | A1* | 11/2003 | Schmucker | ............. B65B 61/28 53/493 |
| 2004/0148910 | A1* | 8/2004 | Edwards | ................... B65B 5/04 53/170 |

FOREIGN PATENT DOCUMENTS

| | | | | |
|---|---|---|---|---|
| CN | 109335107 A | * | 2/2019 | ............. B65B 25/00 |
| DE | 19510392 A1 | * | 9/1996 | ............... B65B 5/04 |

(Continued)

Primary Examiner — Thomas M Wittenschlaeger
(74) Attorney, Agent, or Firm — Avek IP, LLC

(57) ABSTRACT

An integrated device includes a rack (1) which holds three layers of conveying channels from top to bottom: a detection conveying channel (4), a loading conveying channel (3), and a discharge conveying channel (2). The detection conveying channel (4) matches with a detection device (6). One end of the detection conveying channel (4) is provided with a screening opening (7) equipped with a transfer device (8) configured to transfer a case (5) from the screening opening (7) to the loading conveying channel (3). A loading opening is provided in the middle of the loading conveying channel (3), which docks with a loading device (10) provided on the discharge conveying channel (2). The loading conveying channel (3) is positioned on both sides of the loading opening and transports a packaging box (9) and the case (5) to the loading opening.

8 Claims, 7 Drawing Sheets

(51) Int. Cl.
*B65B 35/12* (2006.01)
*G01N 21/88* (2006.01)

(56) References Cited

FOREIGN PATENT DOCUMENTS

| WO | WO-2015140061 A1 | * | 9/2015 | ........... B65B 25/143 |
| WO | WO-2017003241 A1 | * | 1/2017 | ............. G01B 11/24 |

* cited by examiner though the loading conveying channel (3). A loading opening is provided in a middle part of the loading conveying channel (3). The loading opening docks with a loading device (10) provided on the discharge conveying channel (2). The loading con-

INTEGRATED DEVICE FOR DETECTING AND PACKAGING 3D PRINTED PHONE CASE

CROSS REFERENCE TO RELATED APPLICATIONS

This application claims priority to Chinese application number 201910559390.9 filed on Jun. 26, 2019, the disclosure of which is incorporated by reference herein in its entirety.

FIELD OF THE DISCLOSURE

The disclosure relates generally to devices for processing phone cases. More specifically, the disclosure relates to integrated devices for detecting and packaging 3D printed phone cases.

BACKGROUND

With the progress of science and technology, mobile phones have become an integral part of our daily life. Phone cases as well as various smartphones are emerging. As shown in FIG. 2, there are a top view of a phone case on the upper part and a front view of the phone case on the lower part. An opening in the top view is typically used to fit a camera and thus is described as a camera opening. Most such products are traditionally formed through casting. With the development of science and technology, 3D printing emerged as a new way of production. Accordingly, part of phone cases may be formed by means of 3D printing. However, it is necessary to perform visual detection on most of these phone cases to determine whether or not internal sides of the phone cases are notched and then package and load the phone cases. At present, detection, packaging, and loading are independent of one another and performed by means of conveying channels in cooperation with manual operation, resulting in low efficiency.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides an integrated device for detecting and packaging a 3D printed phone case, including a rack (1). The rack (1) holds three layers of conveying channels from top to bottom: a detection conveying channel (4), a loading conveying channel (3), and a discharge conveying channel (2). The detection conveying channel (4) matches with a detection device (6). An end of the detection conveying channel (4) is provided with a screening opening (7). The screening opening (7) is equipped with a transfer device (8) configured to transfer a case (5) from the screening opening (7) to the loading conveying channel (3). A loading opening is provided in a middle part of the loading conveying channel (3). The loading opening docks with a loading device (10) provided on the discharge conveying channel (2). The loading conveying channel (3) is positioned on both sides of the loading opening and transports a packaging box (9) and the case (5) to the loading opening.

Optionally, the loading device (10) is positioned into the discharge conveying channel (2) from a front side of the discharge conveying channel (2) through a box body (21). A lower bottom surface of the box body (21) and the discharge conveying channel (2) are provided with a loading receiving opening (22). The rack (1) is provided with a loading receiving cylinder (23). The loading receiving cylinder (23) is connected with a loading receiving block (24) configured to pass through a loading receiving opening (22). A discharge driving cylinder (11) is provided in the material conveying channel (2). The discharge driving cylinder (11) is connected with a discharge driving block (12) matching the box body (21).

Optionally, a thickness of the loading receiving block (24) is smaller than that of a bottom plate of the material discharging channel (2). A lower part of the loading receiving block (24) is provided with a loading receiving guide rod (26) configured to pass through a loading limit block (25). A lower end of the loading receiving guide rod (26) is connected with a loading-cooperative limit block (27). When the loading-cooperative limit block (27) is in contact with the loading limit block (25), a spacing between the loading receiving block (24) and a bottom surface of the loading conveying channel (3) is the same as a height of the packaging box (9).

Optionally, the transfer device (8) includes a transfer lifting cylinder (14) disposed below the loading conveying channel (3). A cylinder head of the transfer lifting cylinder (14) passes through the box transfer channel (3). The transfer lifting cylinder (14) is connected to a transfer receiving block (15) matching the screening opening (7). A bottom surface of the loading conveying channel (3) is provided with a transfer-cooperative recess (16) matching the transfer receiving block (15).

Optionally, the detection device (6) includes a lower detection frame (31) provided on a lower side of the detection conveying channel (4) and an upper detection frame (37) provided on an upper side of the detection conveying channel (4). A CCD detection device (40) and a detection interception cylinder (38) are arranged below the upper detection frame (37). A detection interception block (39) is positioned below the detection interception cylinder (38). Two sets of detection lifting cylinders (32) are disposed on the lower detection frame (31). The two sets of detection lifting cylinders (32) are connected with two corresponding detection lifting rods (33) configured to pass through the detection conveying channel (4). The two detection lifting rods (33) match the front and the rear of the case (5) in the detection conveying channel (4).

Optionally, the detection conveying channel (4) is provided with detection notches on both the front and rear side plates of the detection device (6). The detection notch is connected with the detection retractable block (35) through the detection retractable spring (34). The detection retractable block (35) is connected with the retractable guide rod (36) configured to pass through a side plate of the detection conveying channel (4). When the detection retractable spring (34) is not subjected to an external force, the detection retractable block (35) levels with an inside surface of the side plate of the detection conveying channel (4).

Optionally, the upper detection frame (37) is provided with a size detection cylinder (41). The size detection cylinder (41) is connected with a size detection block (42). The size detection block (42) matches the CCD detection device (40) in a socket fitting. The size detection block (42) is a right-angle block. A first contact sensor (43) matching the case (5) is installed on an inner side of a vertical portion of the size detection block (42).

Optionally, a position detection cylinder (44) is provided on a horizontal part of the size detection block (42). A position detection mounting block (45) is positioned below the position detection cylinder (44). A position detection block (46) matching a camera opening of the case (5) is provided below the position detection mounting block (45). A second contact sensor (47) is provided outside the position detection block (46). The position detection block (46) has a thickness lower than that of a housing. A depth detection opening is provided in the position detection block (46). A pressure sensor (50) is provided in the depth detection opening. The pressure sensor (50) is configured to measure a pressure by a depth detection spring (48) connected with a depth detection column (49) whose lower end exceeds the position detection block (46).

BRIEF DESCRIPTION OF THE DRAWINGS

Illustrative embodiments of the present disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

As shown in FIGS. 1-7, 1 represents rack, 2 represents discharge conveying channel, 3 represents loading conveying channel, 4 represents detection conveying channel, 5 represents case, 6 represents detection device, 7 represents screening opening, 8 represents transfer device, 9 represents packaging box, 10 represents loading device, 11 represents discharge driving cylinder, 12 represents discharge driving block, 14 represents transfer lifting cylinder, 15 represents transfer receiving block, 16 represents transfer-cooperative recess, 21 represents box, 22 represents loading receiving opening, 23 represents loading receiving cylinder, 24 represents loading receiving block, 25 represents loading limit block, 26 represents loading receiving guide rod, 27 represents loading-cooperative limit block, 31 represents lower detection frame, 32 represents detection lifting cylinder, 33 represents detection lifting rod, 34 represents detection retractable spring, 35 represents detection contraction block, 36 represents retractable guide rod, 37 represents upper detection frame, 38 represents detection interception cylinder, 39 represents detection interception block, 40 represents CCD detection device, 41 represents size detection cylinder, 42 represents size detection block, 43 represents first contact sensor, 44 represents position detection cylinder, 45 represents position detection mounting block, 46 represents position detection block, 47 represents second contact sensor, 48 represents depth detection spring, 49 represents depth detection column, and 50 represents pressure sensor.

Figure 1:
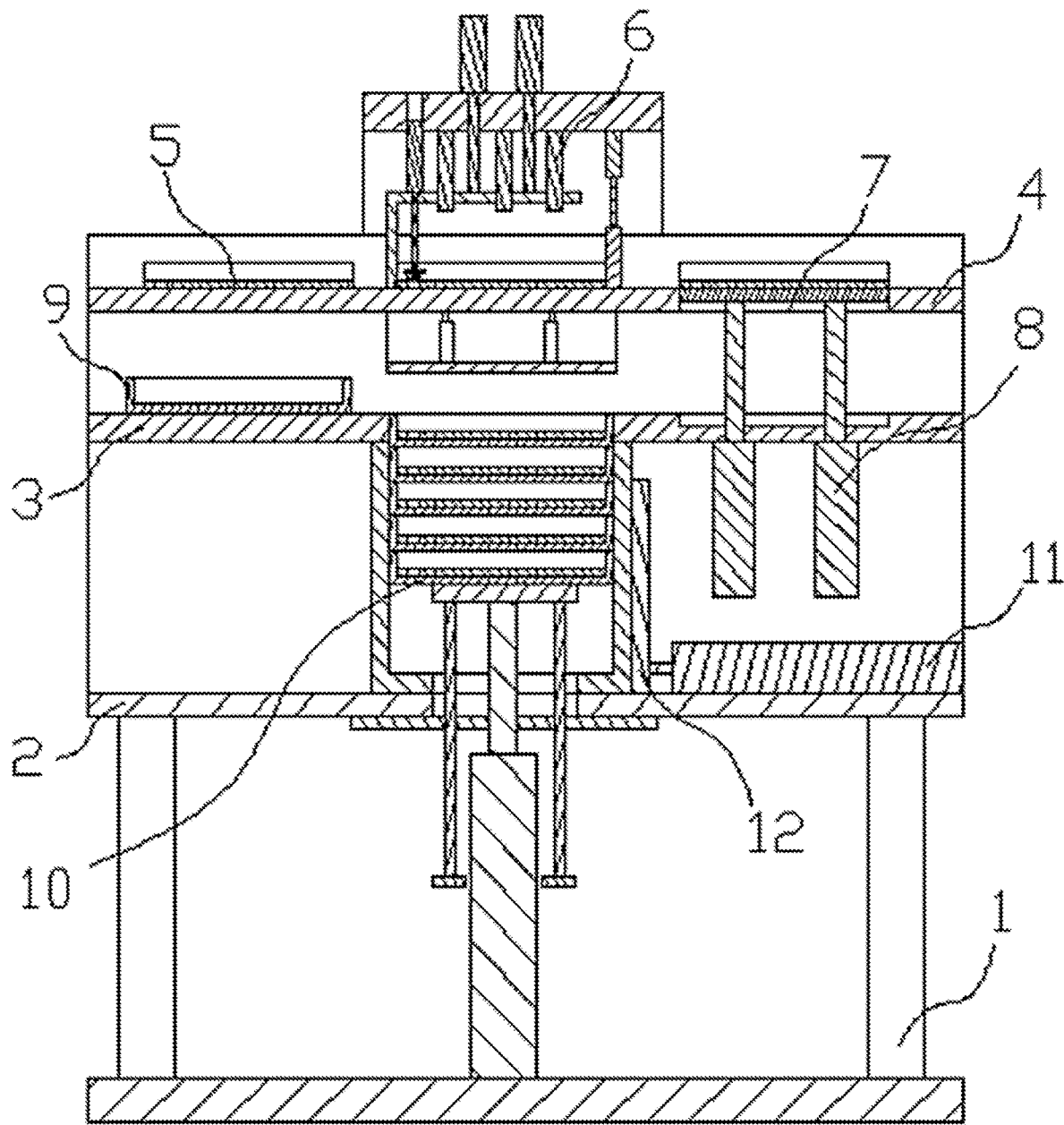
FIG. 1 is a schematic structural diagram of an integrated device for detecting and packaging a 3D printed phone case according to an embodiment of the disclosure.
Figure 2:
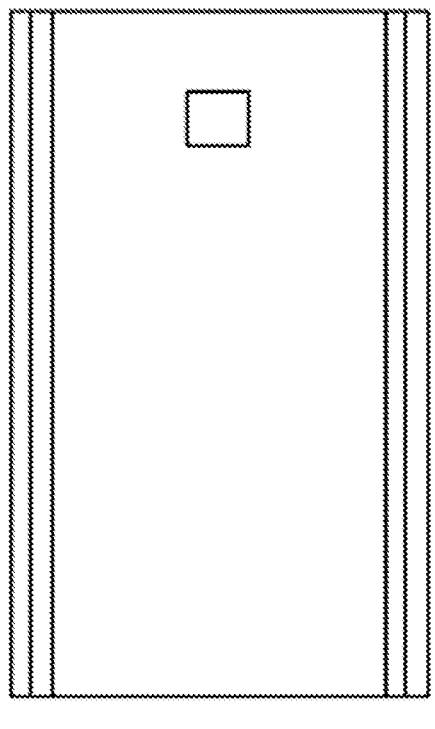
FIG. 2 is a schematic diagram of the structure of a case according to an embodiment of the disclosure.
Figure 2:

As shown in FIG. 1, an integrated device for detecting and packaging a 3D printed phone case of the disclosure may include a rack 1, where a detection conveying channel 4, a loading conveying channel 3, a discharge conveying channel 2 are arranged on the rack 1 from top to bottom. A screening opening 7 in cooperation with a transfer device 8 capable of transferring a case 5 to the loading conveying channel 3 via the screening opening 7 is formed in the tail end of the detection conveying channel 4 in cooperation with a detection device 6. A loading opening in the middle of the loading conveying channel 3 abuts against a loading device 10 on the discharge conveying channel 2. A packaging box 9 and the case 5 on the loading conveying channel 3 are oppositely conveyed towards the loading opening.

First, the case 5 is stored on the detection conveying channel 4, and the packaging box 9 is stored on the loading conveying channel 3. The case is conveyed by the detection conveying channel 4 to be below the detection device 6 and then detected by the detection device 6 to be determined as being qualified or unqualified. If the case is unqualified, the transfer device 8 removes the case from the tail end of the detection conveying channel 4 without detecting the case. If the case is qualified, the transfer device 8 allows the case to fall to the loading conveying channel 4 via the screening opening, the loading conveying channel 3 conveys the packaging box 9 into the loading device 10 and then conveys the case 4 into the packaging box 9 in the loading device 10. In this way, detection, packaging, and loading of a phone case are achieved in one step, so that operational efficiency is greatly improved.

Figure 4:
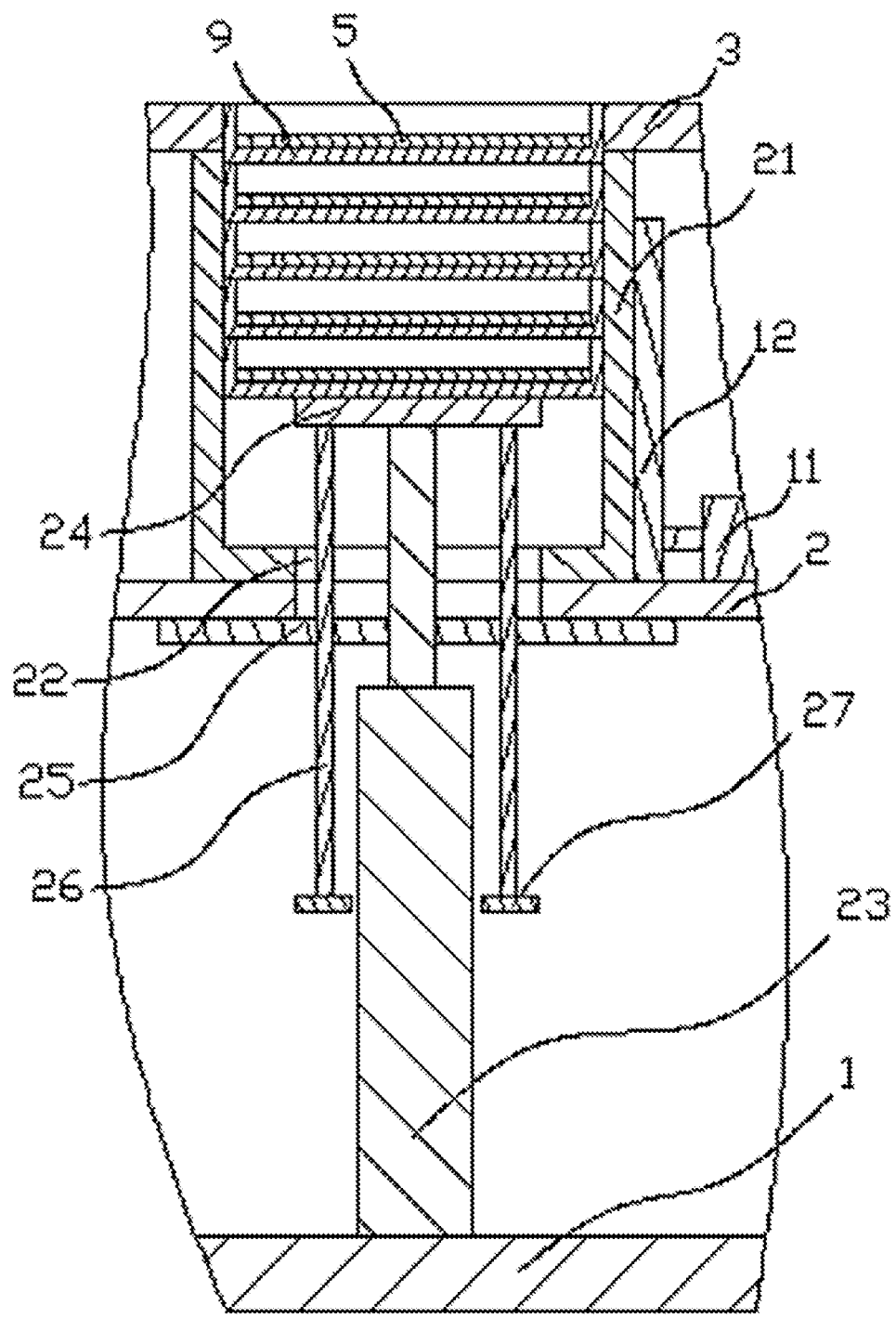
FIG. 4 is a schematic diagram of the structure of a loading device according to an embodiment of the disclosure.

As shown in FIG. 4, the loading device 10 is placed into a box 21 on the discharge conveying channel 2 from a front side of the discharge conveying channel 2. Loading receiving openings 22 are respectively formed in the bottom surface of the box 21 and the discharge conveying channel 2. A loading receiving cylinder 23 is arranged on the rack 1 and connected to a loading receiving block 24, which are capable of penetrating through the loading receiving openings 22. A discharge driving cylinder 11 is arranged in the discharge conveying channel 2 and connected to a discharge driving block 12, which cooperates with the box 21.

The loading device 10 is operated as follows: the box 21 is placed first and abuts against the loading receiving openings 22 in the discharge conveying channel 2. Next, the loading receiving block 24 is driven by the loading receiving cylinder 23 to rise to be spaced from the loading conveying channel 3 by an appropriate distance, and the loading conveying channel 3 conveys the packaging box 9 onto the loading receiving block 24 and then conveys the case 5 into the packaging box 9 to complete packaging of one case. Then, the loading receiving block 24 is lowered by a height of one packaging box 9 to continue subsequent packaging and loading. After all cases are loaded, the loading receiving block 24 will fall below the box 1. Next, the discharge driving block 12 is driven by the discharge driving cylinder 11 to move to make the packaged cases conveyed out of the discharge conveying channel 2. By means of the above operation, stacked packaging and loading may be implemented without influencing conveying of the packaged cases.

As shown in FIG. 4, the loading receiving block 24 is thinner than a bottom plate of the discharge conveying channel 2. A loading limit block 25 is arranged on the lower side of the discharge conveying channel 2. Loading receiving guide rods 26, which are capable of penetrating through the loading limit block 25, are arranged on the lower side of the loading receiving block 24 and have lower ends connected to loading-cooperative limit blocks 27. When the loading-cooperative limit blocks 27 contact with the loading limit block 25, a distance between the loading receiving block 24 and an internal bottom surface of the loading conveying channel 3 is the same as the height of the packaging box 9.

By means of cooperation between the loading limit block 25 and the loading receiving guide rods 26, the loading receiving block 24 is horizontal when rising and falling. By means of cooperation between the loading limit block 25 and the loading-cooperative limit blocks 27, the loading receiving block 24 may be located at a proper height during loading of the first packaging box 9 to facilitate the loading, and may separate from the box 21 when the box 21 needs to be removed after all the packaged cases are loaded.

Figure 3:
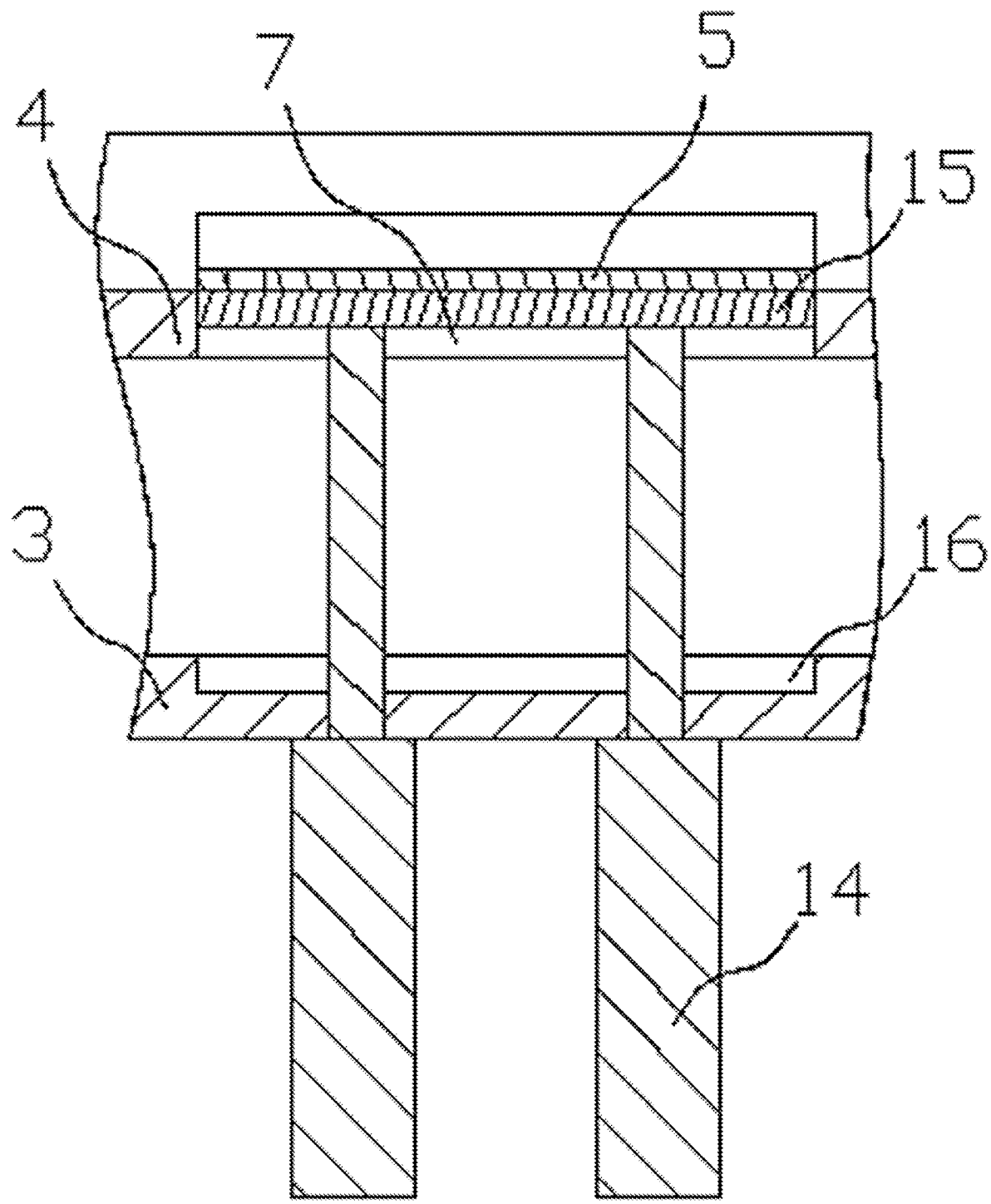
FIG. 3 is a schematic diagram of the structure of a transfer device according to an embodiment of the disclosure.

As shown in FIG. 3, the transfer device 8 may include transfer lifting cylinders 14, which are arranged at the lower side of the loading conveying channel 3 and have heads penetrating through the loading conveying channel 3, where a transfer receiving block 15 in cooperation with the screening opening 7 is connected to the transfer lifting cylinders 14, and a transfer-cooperative recess 16 in cooperation with the transfer receiving block 15 is formed in the internal bottom surface of the loading conveying channel 3.

The transfer device 8 is operated as follows: at first, the transfer receiving block 15 is aligned to the detection conveying channel 4. When conveyed to the screening opening 7, the detected case 5 is continuously conveyed out of the detection conveying channel 4 if being unqualified and falls, if being qualified, in a manner that the transfer lifting cylinders 14 drive the transfer receiving block 15 to fall until the transfer receiving block 15 fall into the transfer-cooperative recess 16. As such, the case 5 will fall onto the loading conveying channel 3.

Figure 5:
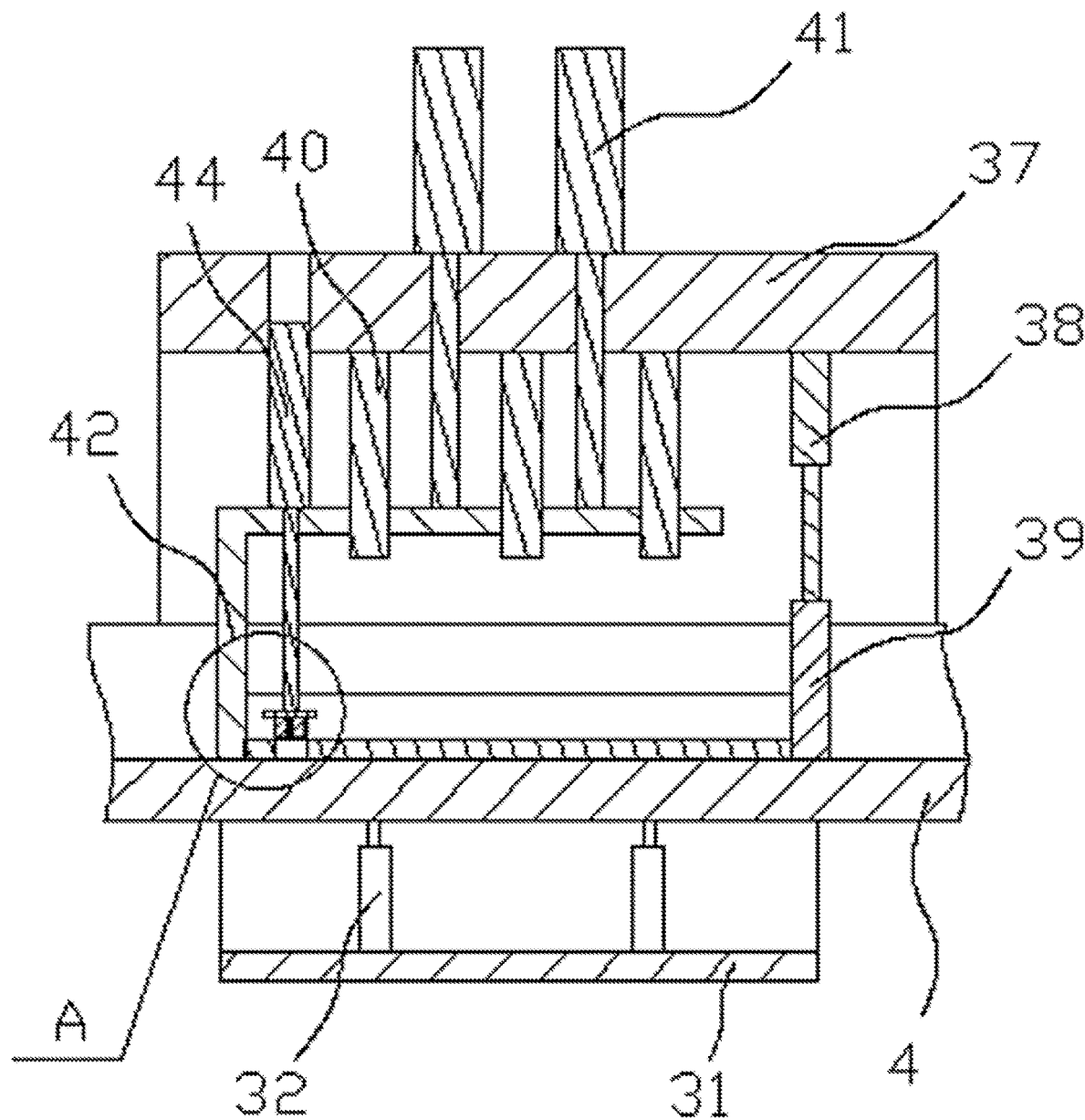
FIG. 5 is a schematic diagram of the structure of a detection device according to an embodiment of the disclosure.
Figure 6:
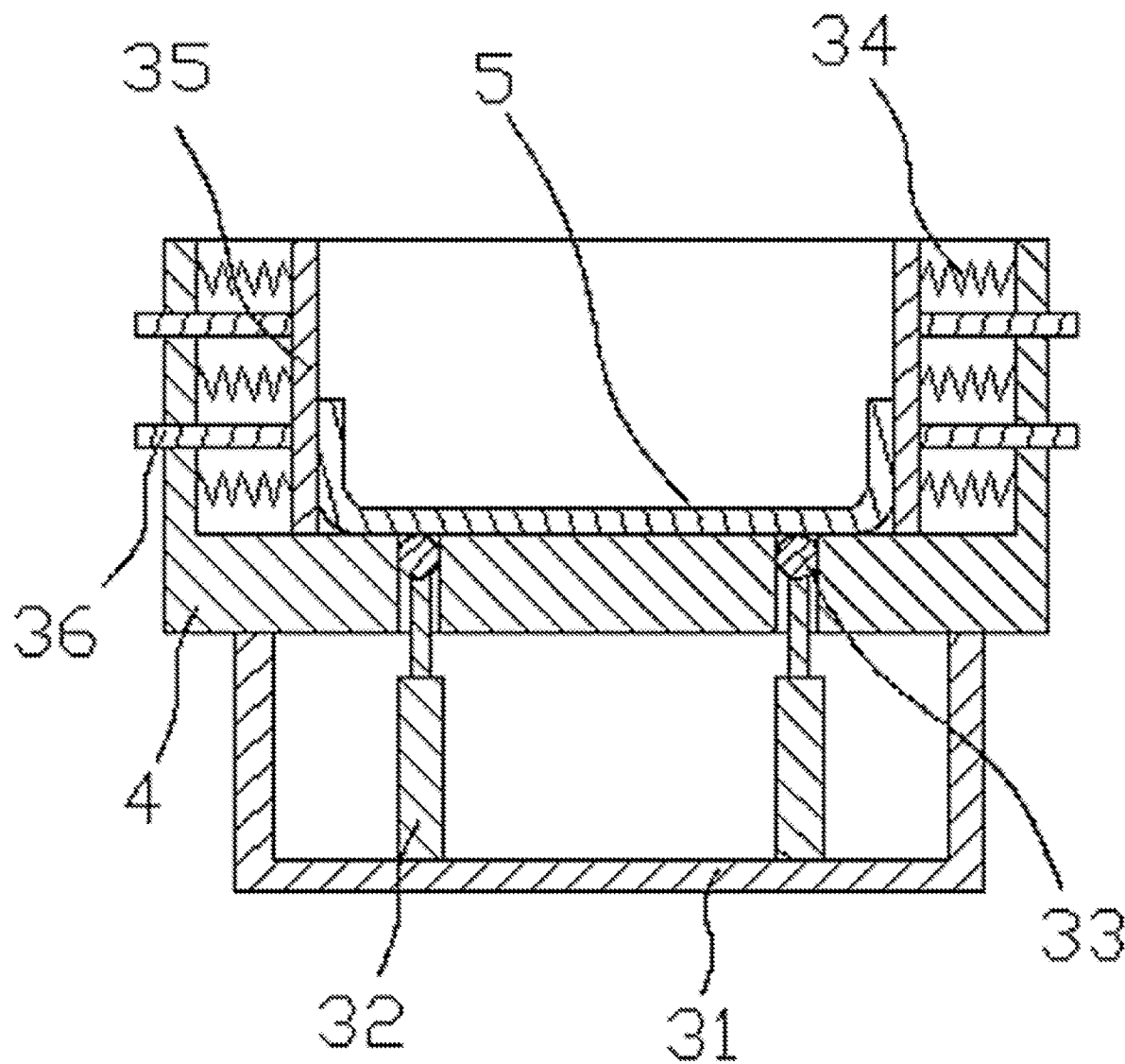
FIG. 6 is a cross-sectional view of a matching part of a detection conveying channel and a detection device according to an embodiment of the disclosure.

As shown in FIG. 5-6, the detection device 6 may include a lower detection frame 31 arranged on the lower side of the detection conveying channel 4 as well as an upper detection frame 37 arranged on the upper side of the detection conveying channel 4, where detection charge coupled devices (CCDs) 40 and a detection interception cylinder 38 are arranged on the lower side of the upper detection frame 37, and a detection interception block 39 below the detection interception cylinder 38 is connected to the detection interception cylinder 38. Two detection lifting cylinders 32 are arranged on the lower detection frame 31, and detection lifting rods 33 above the detection lifting cylinders 32 are respectively connected to the detection lifting cylinders 32 and are capable of penetrating through the detection conveying channel 4 to be matched with the front portion and the rear portion of the case 5 in the detection conveying channel 4.

After the case 5 is conveyed to a detection station and stopped by the detection interception block 39, one detection lifting cylinder 32 drives the corresponding detection lifting rod 33 to rise to make the case 5 tilted, and the CCD detection devices 40 visually detect the case 5. Next the detection lifting cylinders 32 is returned, and the other detection lifting cylinders 32 drives the corresponding detection lifting rod 33 to rise to make the case 5 tilted again. In this way, the case 5 is tilted twice to be detected by the CCD detection devices 40 to determine that whether or not a visual blind spot exists on the joint between a side plate and a bottom plate of the case 5, so that the detection effect is excellent.

As shown in FIG. 6, detection recesses are formed in a front side plate and a rear side plate, extending into the detection device, of the detection conveying channel 4, and detection retractable blocks 33 are connected into the detection recesses through detection retractable springs 34 and connected to retractable guide rods 36 capable of penetrating the side plates of the detection conveying channel 4. When the detection retractable springs 34 are not squeezed, the detection retractable blocks 33 are parallel to internal sides of the side plates of the detection conveying channel 4.

The detection retractable blocks 33 and the detection retractable springs 34 may be correspondingly retracted when the case 5 is tilted, so that the case 5 may be prevented against damage caused by forcible squeeze.

Figure 7:
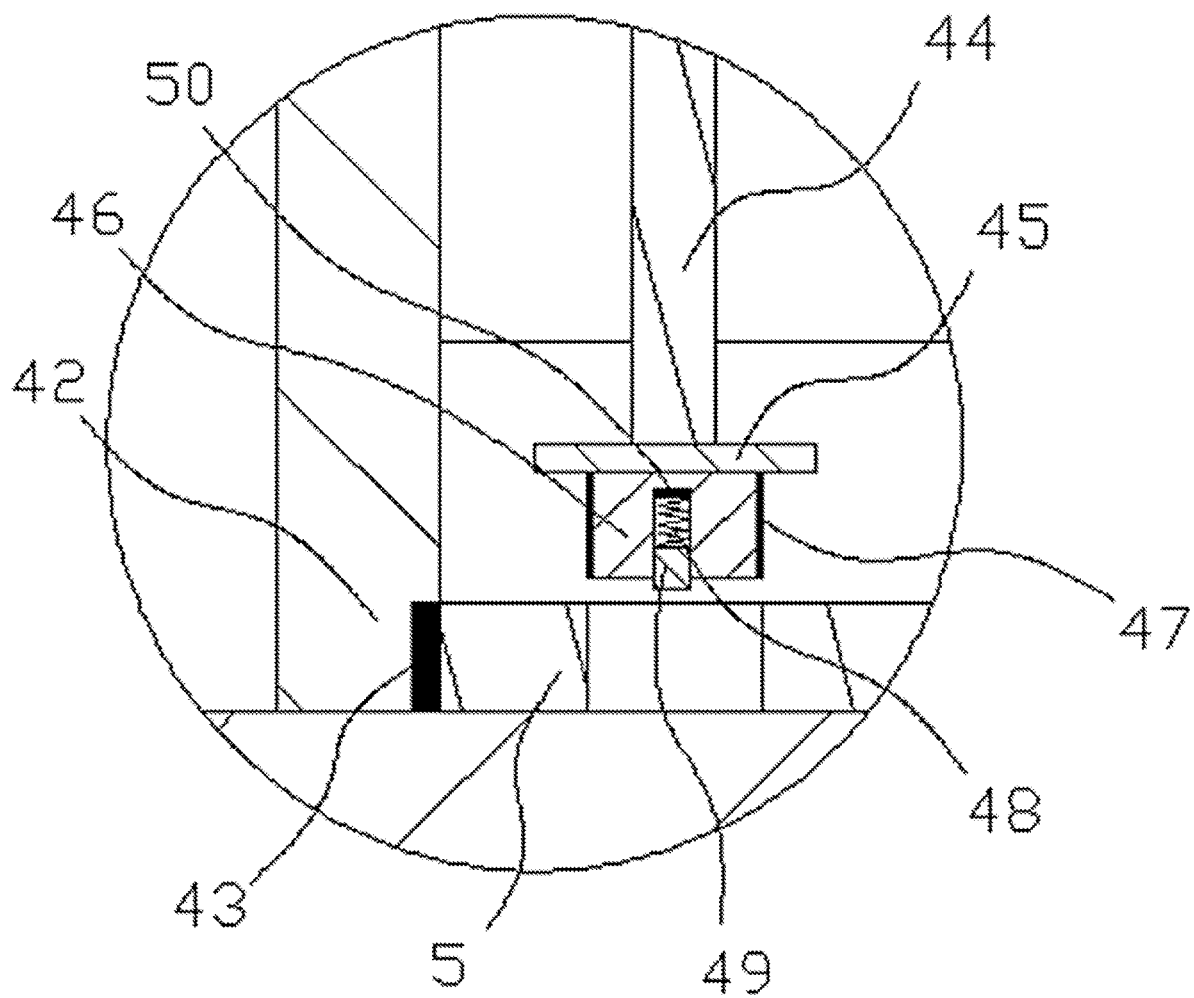
FIG. 7 is a partial enlarged view of A in FIG. 5.

As shown in FIG. 5 and FIG. 7, the upper detection frame 37 is provided with size detection cylinders 41, a right-angled size detection block 42 connected to the size detection cylinders 41 is well nested in the CCD detection devices 40, and a first contact sensor 43 matched with the case 5 is arranged on the internal side of a vertical portion of the right-angled size detection block 42.

After the case 5 is stopped by the detection interception block, the size detection cylinders 41 drive the size detection block 42 to fall to make the vertical portion of the size detection block 42 contact with a bottom plate of the detection conveying channel 4, and whether or not the length of the case 5 is standard is determined by whether or not the first contact sensor 43 generates an inductive signal. The first contact sensor 43 contacts the case 5 if generating an inductive signal, in this case, the length of the case 5 is standard. Otherwise, the length of the case 5 is nonstandard.

As shown in FIG. 7, a position detection cylinder 44 is arranged on a horizontal portion of the size detection block 42, a position detection mounting block 45 below the position detection cylinder 44 is connected to the position detection cylinder 44, a position detection block 46 matched with a camera opening in the case is arranged below the position detection mounting block 45, a second contact sensor 47 is arranged outside the position detection block 46 thinner than the case 5, a depth detection opening is formed in the position detection block 46, and a pressure sensor 50 in the depth detection opening is connected, through a depth detection spring 48, to a depth detection column 49 having a lower end extending beyond the position detection block 46.

After the size of the case is detected, the position detection cylinder 44 drives the position detection mounting block 45 to fall until the position detection mounting block 45 cannot be lowered any more. By means of the above operation, a series of detection may be performed. For example, the position of the camera opening may be detected. If the pressure sensor 50 generates no inductive signal, the position of the camera opening is not matched, and the position detection block 46 is not inserted into the camera opening. If the pressure sensor 50 generates a pressure signal and the second contact sensor 47 generates no inductive signal, the camera opening is extremely large. If the second contact sensor 47 generates the inductive signal, whether or not the thickness of the case 5 is standard is determined by a pressure induced by the pressure sensor

50. If the pressure is higher than a preset maximum pressure induced by the pressure sensor 50, the case is insufficiently thick. If the pressure is lower than a preset minimum pressure induced by the pressure sensor 50, the case 5 is extremely thick.

An objective of the disclosure is to provide an integrated device for detecting and packaging a 3D printed phone case, which may perform detection, packaging, and loading of phone cases in one step, thus greatly improving processing efficiency. In actual use, a control system may be applied to control cooperation of all power units, and control buttons on all the power units may be used to achieve overall operation.

Optionally, a control system may be equipped to control the cooperative work of various power components, and the overall operation may also be achieved through the control buttons of each power component.

In some embodiments, The loading and conveying channel is located on both sides of the loading opening, and transports the packaging box and the case to the loading opening respectively, which may implement the detection of the mobile phone case, the integration of packaging and boxing, and greatly improve the processing effectiveness.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. An integrated device for detecting and packaging a 3D printed phone case, comprising a rack (1), wherein:
   the rack (1) holds three layers of conveying channels from top to bottom: a detection conveying channel (4), a loading conveying channel (3), and a discharge conveying channel (2);
   the detection conveying channel (4) matches with a detection device (6);
   an end of the detection conveying channel (4) is provided with a screening opening (7);
   the screening opening (7) is equipped with a transfer device (8) configured to transfer a case (5) from the screening opening (7) to the loading conveying channel (3);
   a loading opening is provided in a middle part of the loading conveying channel (3);
   the loading opening docks with a loading device (10) provided on the discharge conveying channel (2); and
   the loading conveying channel (3) is positioned on both sides of the loading opening and transports a packaging box (9) and the case (5) to the loading opening.

2. The device according to claim 1, wherein:
   the loading device (10) is positioned into the discharge conveying channel (2) from a front side of the discharge conveying channel (2) through a box body (21);
   a lower bottom surface of the box body (21) and the discharge conveying channel (2) are provided with a loading receiving opening (22);
   the rack (1) is provided with a loading receiving cylinder (23);
   the loading receiving cylinder (23) is connected with a loading receiving block (24) configured to pass through a loading receiving opening (22);
   a discharge driving cylinder (11) is provided in the material conveying channel (2); and
   the discharge driving cylinder (11) is connected with a discharge driving block (12) matching the box body (21).

3. The device according to claim 2, wherein:
   a thickness of the loading receiving block (24) is smaller than that of a bottom plate of the material discharging channel (2);
   a lower part of the loading receiving block (24) is provided with a loading receiving guide rod (26) configured to pass through a loading limit block (25);
   a lower end of the loading receiving guide rod (26) is connected with a loading-cooperative limit block (27); and
   when the loading-cooperative limit block (27) is in contact with the loading limit block (25), a spacing between the loading receiving block (24) and a bottom surface of the loading conveying channel (3) is the same as a height of the packaging box (9).

4. The device according to claim 1, wherein:
   the transfer device (8) comprises a transfer lifting cylinder (14) disposed below the loading conveying channel (3), wherein a cylinder head of the transfer lifting cylinder (14) passes through the box transfer channel (3);
   the transfer lifting cylinder (14) is connected to a transfer receiving block (15) matching the screening opening (7); and
   a bottom surface of the packed loading conveying channel (3) is provided with a transfer-cooperative recess (16) matching the transfer receiving block (15).

5. The device according to claim 1, wherein:
   the detection device (6) comprises a lower detection frame (31) provided on a lower side of the detection conveying channel (4) and a upper detection frame (37) provided on an upper side of the detection conveying channel (4);
   a CCD detection device (40) and a detection interception cylinder (38) are arranged below the upper detection frame (37);
   a detection interception block (39) is positioned below the detection interception cylinder (38);
   two sets of detection lifting cylinders (32) are disposed on the lower detection frame (31);
   the two sets of detection lifting cylinders (32) are connected with two corresponding detection lifting rods (33) configured to pass through the detection conveying channel (4); and
   the two detection lifting rods (33) match the front and the rear of the case (5) in the detection conveying channel (4).

6. The device according to claim 5,
   the detection conveying channel (4) is provided with detection notches on both the front and rear side plates of the detection device (6);
   the detection notch is connected with the detection retractable block (35) through the detection retractable spring (34);

the detection retractable block (35) is connected with the retractable guide rod (36) configured to pass through a side plate of the detection conveying channel (4); and when the detection retractable spring (34) is not subjected to an external force, the detection retractable block (35) levels with an inside surface of the side plate of the detection conveying channel (4).

7. The device according to claim 5, wherein:

the upper detection frame (37) is provided with a size detection cylinder (41);

the size detection cylinder (41) is connected with a size detection block (42);

the size detection block (42) matches the CCD detection device (40) in a socket fitting;

the size detection block (42) is a right-angle block; and a first contact sensor (43) matching the case (5) is installed on an inner side of a vertical portion of the size detection block (42).

8. The device according to claim 7, wherein:

a position detection cylinder (44) is provided on a horizontal part of the size detection block (42);

a position detection mounting block (45) is positioned below the position detection cylinder (44);

a position detection block (46) matching a camera opening of the case (5) is provided below the position detection mounting block (45);

a second contact sensor (47) is provided outside the position detection block (46);

the position detection block (46) has a thickness lower than that of a housing;

a depth detection opening is provided in the position detection block (46);

a pressure sensor (50) is provided in the depth detection opening; and the pressure sensor (50) is configured to measure a pressure by a depth detection spring (48) connected with a depth detection column (49) whose lower end exceeds the position detection block (46).

* * * * *